US012682285B2

(12) United States Patent
Janik et al.

(10) Patent No.: US 12,682,285 B2
(45) Date of Patent: Jul. 14, 2026

(54) PROVIDING A SECURE AND COLLABORATIVE FEEDBACK MECHANISM FOR MACHINE LEARNING MODELS

(71) Applicant: Accenture Global Solutions Limited, Dublin (IE)

(72) Inventors: Adrianna Janik, Dublin (IE); Luca Costabello, Newbridge (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 746 days.

(21) Appl. No.: 18/182,568

(22) Filed: Mar. 13, 2023

(65) Prior Publication Data

US 2024/0311682 A1     Sep. 19, 2024

(51) Int. Cl.
*G06N 20/00* (2019.01)
*G06N 5/045* (2023.01)
(52) U.S. Cl.
CPC ............ *G06N 20/00* (2019.01); *G06N 5/045* (2013.01)
(58) Field of Classification Search
CPC ................................ G06N 20/00; G06N 5/045
See application file for complete search history.

(56) References Cited

U.S. PATENT DOCUMENTS

2022/0114345 A1* 4/2022 Belém ..................... G06F 40/30
2022/0215285 A1* 7/2022 Daly ....................... G06N 20/00

FOREIGN PATENT DOCUMENTS

WO      WO-2021076139 A1 *   4/2021   ............. G06V 20/70

OTHER PUBLICATIONS

Nassar, Mohamed, et al. "Blockchain for explainable and trustworthy artificial intelligence." Wiley Interdisciplinary Reviews: Data Mining and Knowledge Discovery 10.1 (2020): e1340. (Year: 2020).*
H. Zhang, P. Gao, J. Yu, J. Lin and N. N. Xiong, "Machine Learning on Cloud With Blockchain: A Secure, Verifiable and Fair Approach to Outsource the Linear Regression," in IEEE Transactions on Network Science and Engineering, vol. 9, No. 6, pp. 3956-3967, Nov. 1-Dec. 2022 (Year: 2022).*

(Continued)

*Primary Examiner* — Michael J Huntley
*Assistant Examiner* — Alfredo Campos
(74) *Attorney, Agent, or Firm* — Mannava & Kang, P.C.

(57) ABSTRACT

A device may receive, from a user device, a machine learning model, training data, and user input for the machine learning model, and may process the training data and the user input, with the machine learning model, to generate a prediction and an explanation of the prediction. The device may provide the prediction and the explanation to the user device and may receive, from the user device, prediction feedback for the prediction and explanation feedback for the explanation. The device may determine whether an agreement is achieved between the prediction feedback and the explanation feedback based on a threshold and may update the machine learning model based on the agreement being achieved. The device may cryptographically protect the updated machine learning model to generate an updated and cryptographically protected machine learning model and may perform actions based on the updated and cryptographically protected machine learning model.

20 Claims, 13 Drawing Sheets

(56)         References Cited

OTHER PUBLICATIONS

Kulesza et al., "Principles of Explanatory Debugging to Personalize Interactive Machine Learning," IUI '15: Proceedings of the 20th International Conference on Intelligent User Interfaces, Mar. 2015, 14 Pages.

Lee et al., "Towards Efficient Annotations for a Human-AI Collaborative, Clinical Decision Support System: A Case Study on Physical Stroke Rehabilitation Assessment," IUI '22: 27th International Conference on Intelligent User Interfaces, Mar. 2022, 8 Pages.

Piria et al., "A data analytics approach to building a clinical decision support system for diabetic retinopathy: Developing and deploying a model ensemble," Decision Support Systems, vol. 101, Sep. 2017, 9 Pages.

* cited by examiner

120
Provide the prediction and the explanation to the user device

125
Receive, from the user device, prediction feedback for the prediction and explanation feedback for the explanation

100

Decision support system

User device

User

100

100

| Authorization (wt.) | Correction | $P_a$ | $P_o$ | $\Delta T$ | $\Delta N$ | $\Delta M$ |
|---|---|---|---|---|---|---|
| Intern (1) | -1 | 0.1 | 0.8 | -0.2 | -0.3 | -0.2 |
| Intern (1) | -1 | 0.2 | 0.8 | -0.3 | -0.2 | -0.1 |
| Medical doctor (2) | -1 | 0.4 | 0.8 | -0.1 | -0.2 | -0.1 |
| Oncologist (3) | -1 | 0.3 | 0.8 | -0.145 | -0.225 | -0.225 |

130

Determine whether an agreement is achieved between the prediction feedback and the explanation feedback based on a quorum threshold Agreement No agreement

135

Prevent update of the machine learning model based on an agreement not being achieved between the prediction feedback and the explanation feedback No update Compute agreement Decision support system Explanation feedback Prediction feedback

FIG. 1G

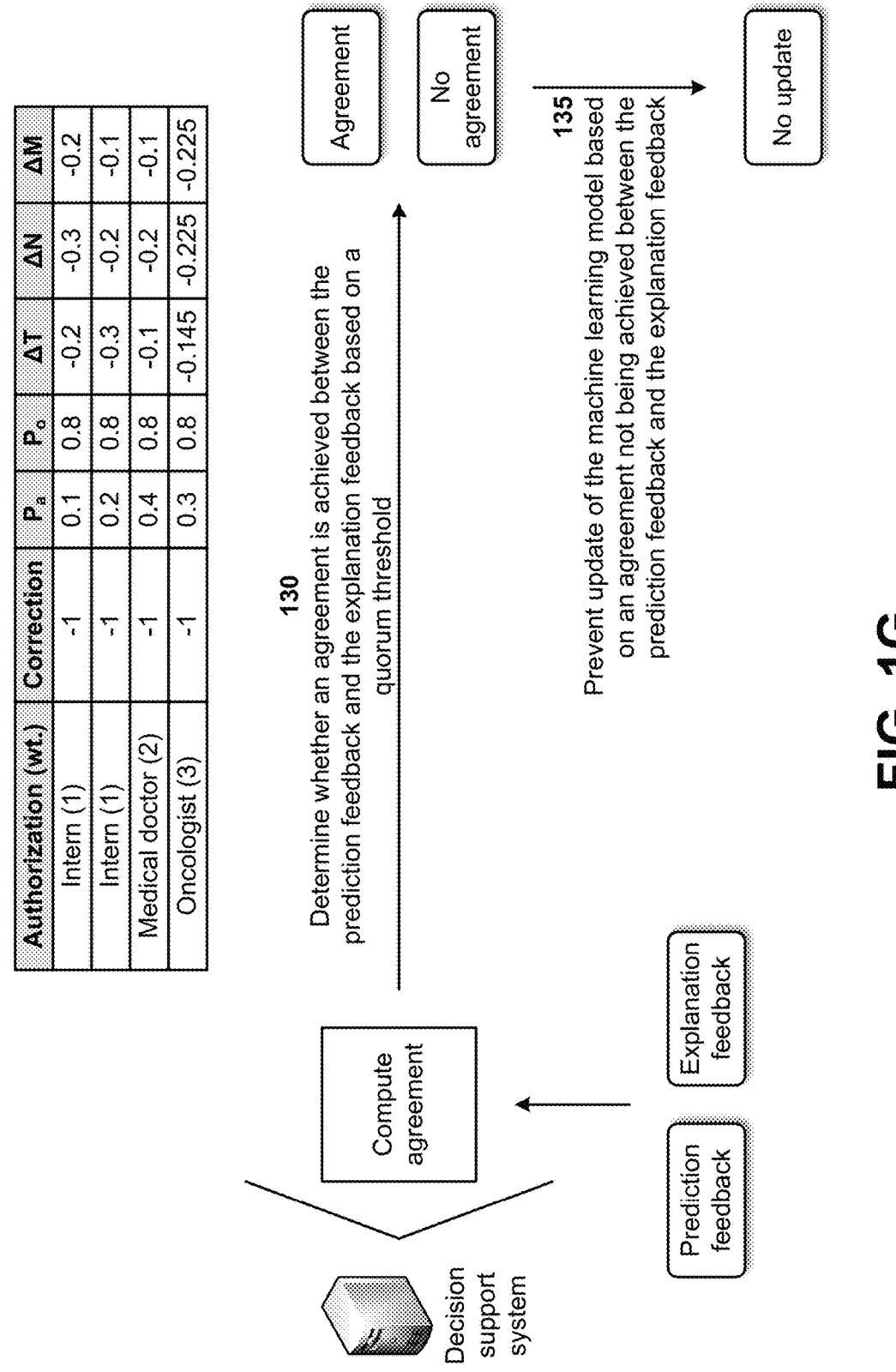

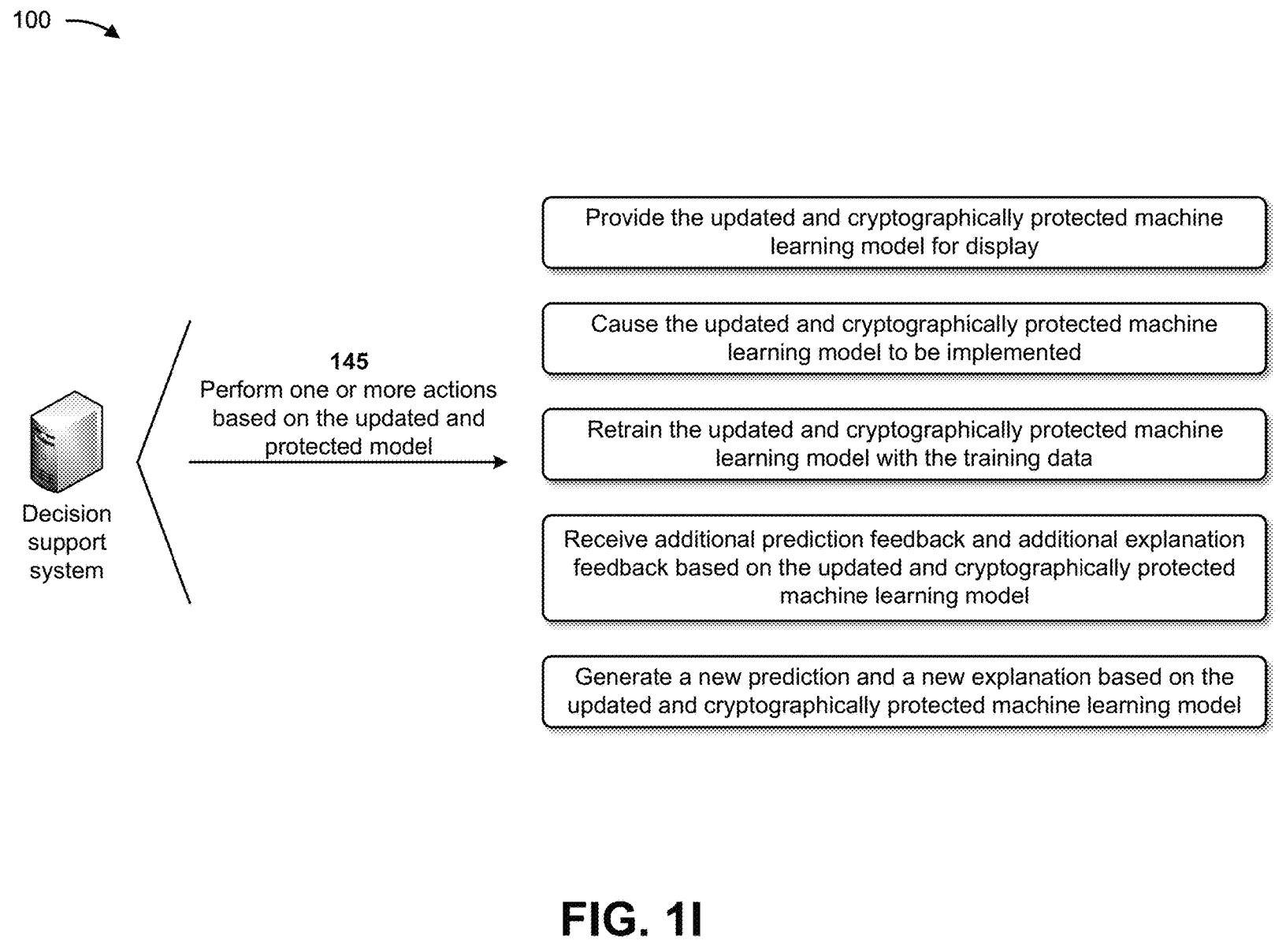

100

145
Perform one or more actions based on the updated and protected model

Decision support system

Provide the updated and cryptographically protected machine learning model for display Cause the updated and cryptographically protected machine learning model to be implemented Retrain the updated and cryptographically protected machine learning model with the training data Receive additional prediction feedback and additional explanation feedback based on the updated and cryptographically protected machine learning model Generate a new prediction and a new explanation based on the updated and cryptographically protected machine learning model

FIG. 1I

PROVIDING A SECURE AND COLLABORATIVE FEEDBACK MECHANISM FOR MACHINE LEARNING MODELS

BACKGROUND

A decision support system is an information system that supports business or organizational decision-making activities. A decision support system may serve management, operations, and planning levels of an organization and enable people to make decisions about problems that may be rapidly changing and not easily specified in advance (e.g., unstructured and semi-structured decision problems).

SUMMARY

Some implementations described herein relate to a method. The method may include receiving, from a user device, a machine learning model, training data utilized to train the machine learning model, and user input for the machine learning model, and processing the training data and the user input, with the machine learning model, to generate a prediction and an explanation of the prediction. The method may include providing the prediction and the explanation to the user device and receiving, from the user device, prediction feedback for the prediction and explanation feedback for the explanation. The method may include determining whether an agreement is achieved between the prediction feedback and the explanation feedback based on a threshold and updating the machine learning model based on the agreement being achieved between the prediction feedback and the explanation feedback, to generate an updated machine learning model. The method may include cryptographically protecting the updated machine learning model to generate an updated and cryptographically protected machine learning model and performing one or more actions based on the updated and cryptographically protected machine learning model.

Some implementations described herein relate to a device. The device may include one or more memories and one or more processors coupled to the one or more memories. The one or more processors may be configured to receive, from a user device, a machine learning model, training data utilized to train the machine learning model, and user input for the machine learning model, and process the training data and the user input, with the machine learning model, to generate a prediction and an explanation of the prediction. The one or more processors may be configured to provide the prediction and the explanation to the user device and receive, from the user device, prediction feedback for the prediction and explanation feedback for the explanation. The one or more processors may be configured to determine whether an agreement is achieved between the prediction feedback and the explanation feedback based on a threshold and update the machine learning model based on the agreement being achieved between the prediction feedback and the explanation feedback, to generate an updated machine learning model. The one or more processors may be configured to cryptographically protect the updated machine learning model to generate an updated and cryptographically protected machine learning model and perform one or more actions based on the updated and cryptographically protected machine learning model.

Some implementations described herein relate to a non-transitory computer-readable medium that stores a set of instructions. The set of instructions, when executed by one or more processors of a device, may cause the device to receive, from a user device, a machine learning model, training data utilized to train the machine learning model, and user input for the machine learning model, and process the training data and the user input, with the machine learning model, to generate a prediction and an explanation of the prediction. The set of instructions, when executed by one or more processors of the device, may cause the device to provide the prediction and the explanation to the user device and receive, from the user device, prediction feedback for the prediction and explanation feedback for the explanation. The set of instructions, when executed by one or more processors of the device, may cause the device to determine whether an agreement is achieved between the prediction feedback and the explanation feedback based on a threshold and update the machine learning model based on the agreement being achieved between the prediction feedback and the explanation feedback, to generate an updated machine learning model. The set of instructions, when executed by one or more processors of the device, may cause the device to cryptographically protect the updated machine learning model to generate an updated and cryptographically protected machine learning model and perform one or more actions based on the updated and cryptographically protected machine learning model.

BRIEF DESCRIPTION OF THE DRAWINGS

FIGS. 1A-1I are diagrams of an example implementation described herein.

DETAILED DESCRIPTION

Figure 1A:
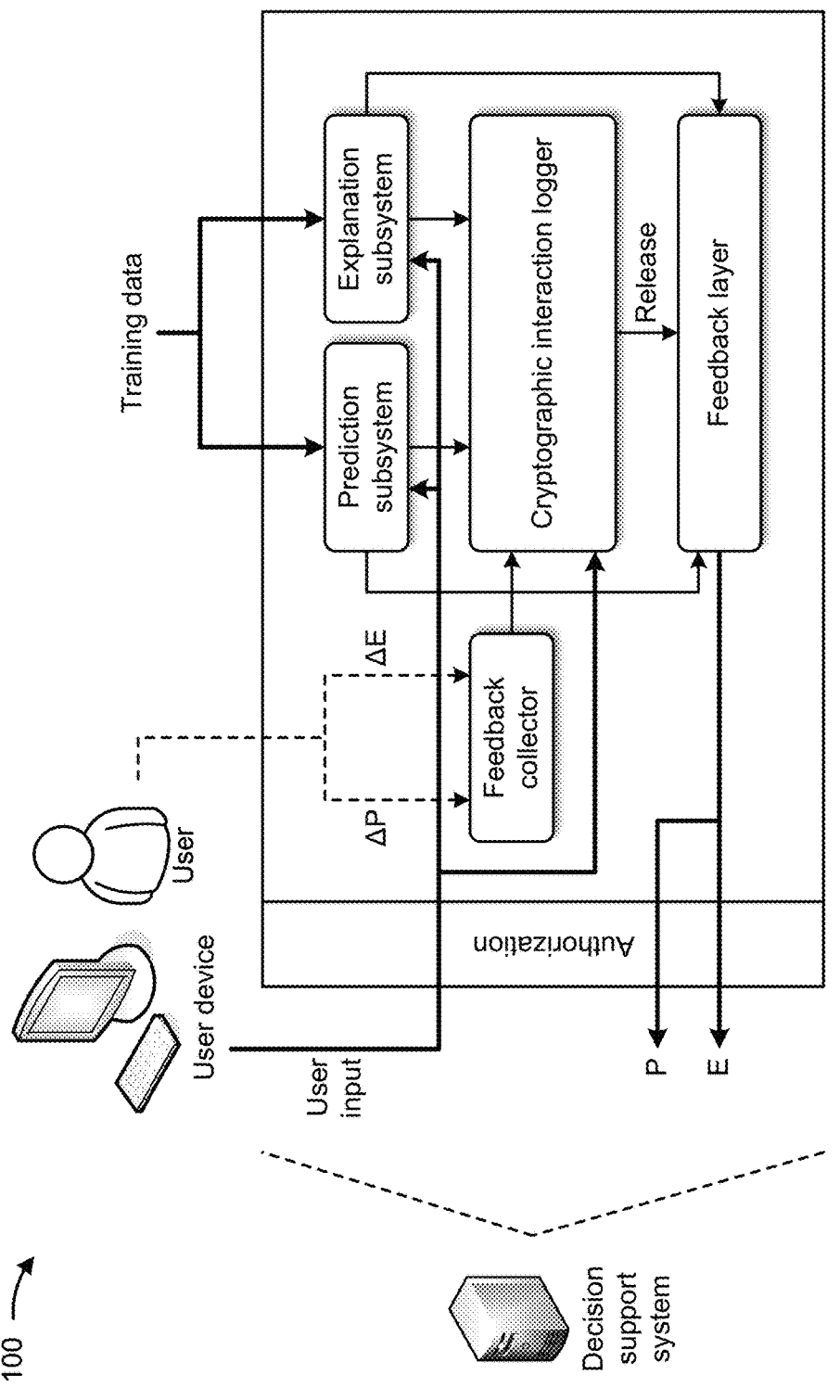

The following detailed description of example implementations refers to the accompanying drawings. The same reference numbers in different drawings may identify the same or similar elements.

A data collection process required to build training data for a machine learning model (e.g., of a decision support system) is prone to errors. A decision support system may utilize a machine learning model to learn from past training data. Therefore, a decision support system may include errors generated from the data collection process (e.g., the collected training data is incomplete). A decision support system may also experience errors from misinterpretation (e.g., due to insufficient documentation, lack of standardization, lack of domain expertise during a data processing phase, miscommunication between domain experts and system developers, and/or the like), a misrepresented training objective, and/or the like.

Robustness of a decision support system relies on the ability of the decision support system to detect such errors and minimize influence of the errors. This often requires specialized domain-specific knowledge and a collaborative approach between teams developing a decision support system and future users of the decision support system. Utilizing domain experts (e.g., medical experts, such as oncologists) requires significant understanding of a domain associated with a decision support system and dependencies of the domain. For example, a quality of training data and processing of the training data may have major implications on the decision support system. Including domain expert feedback in the process of training the decision support system may be crucial and may result in contradictory and inconsistent domain expert feedback (e.g., when domain experts disagree). Another problem may arise when decisions are changed during the process of defining the decision support system and the changed specifications are not communicated to decision system developers.

Therefore, current techniques for generating training data for a machine learning model of a decision support system consume computing resources (e.g., processing resources, memory resources, communication resources, and/or the like), networking resources, and/or the like associated with failing to collect usable domain expert feedback for training of the machine learning model of the decision support system, generating an erroneous decision support system based on failing to collect usable domain expert feedback, implementing the erroneous decision support system, utilizing incorrect results generated by the erroneous decision support system, performing expensive and possibly unnecessary processes to correct the erroneous decision support system, and/or the like.

Some implementations described herein relate to a decision support system that provides a secure and collaborative feedback mechanism for machine learning models of the decision support system. For example, the decision support system may receive, from a user device, a machine learning model, training data utilized to train the machine learning model, and user input for the machine learning model, and may process the training data and the user input, with the machine learning model, to generate a prediction and an explanation of the prediction. The decision support system may provide the prediction and the explanation to the user device and may receive, from the user device, prediction feedback for the prediction and explanation feedback for the explanation. The decision support system may determine whether an agreement is achieved between the prediction feedback and the explanation feedback based on a threshold and may update the machine learning model based on the agreement being achieved between the prediction feedback and the explanation feedback, to generate an updated machine learning model. The decision support system may cryptographically protect the updated machine learning model to generate an updated and cryptographically protected machine learning model and may perform one or more actions based on the updated and cryptographically protected machine learning model.

In this way, the decision support system provides a secure and collaborative feedback mechanism for machine learning models of the decision support system. For example, the decision support system may support collection of usable feedback from multiple domain experts for training of a machine learning model of the decision support system and may directly utilize domain expert feedback with an agreement mechanism that improves the decision support system over time. The decision support system may provide a decision tracking mechanism that enables the decision support system to be transparent with regards to changes suggested by the domain experts. The decision support system may prevent tampering with domain expert feedback by encrypting the domain expert feedback into a block chain of blocks (e.g., where every block depends on a previous block's hash). The decision support system may enable historical updates to the machine learning model to be reviewed and may enable previous versions of the machine learning model (e.g., prior to updates) to be reimplemented. This, in turn, conserves computing resources, networking resources, and/or the like that would otherwise have been consumed in failing to collect usable domain expert feedback for training of the machine learning model of the decision support system, generating an erroneous decision support system based on failing to collect usable domain expert feedback, implementing the erroneous decision support system, utilizing incorrect results generated by the erroneous decision support system, performing expensive and possibly unnecessary processes to correct the erroneous decision support system, and/or the like.

FIGS. 1A-1I are diagrams of an example 100 associated with providing a secure and collaborative feedback mechanism for machine learning models of the decision support system. As shown in FIGS. 1A-1I, example 100 includes a user device associated with a user and a decision support system. The user device may include a wireless communication device, a mobile phone, a user equipment, a laptop computer, a tablet computer, a desktop computer, and/or the like. The decision support system may include a system that provides a secure and collaborative feedback mechanism for machine learning models of the decision support system. Further details of the user device and the decision support system are provided elsewhere herein.

As shown in FIG. 1A, the decision support system may include a prediction subsystem, an explanation subsystem, a feedback collector, a cryptographic interaction logger, and a feedback layer. The prediction subsystem may include a predictive machine learning model (e.g., a classification model) that is trained to make predictions in a given domain. The explanation subsystem may include an explainable machine learning model (e.g., a Shapley additive explanations (SHAP) model) that is trained to explain the predictions. The predictive machine learning model of the prediction subsystem and the explainable machine learning model of explanation subsystem may together be referred to herein as a "machine learning model." As further shown in FIG. 1A, the prediction subsystem may receive training data and may process the training data, with the predictive machine learning model, to generate a prediction (P). The explanation subsystem may receive the training data and may process the training data, with the explainable machine learning model, to generate an explanation (E) of the prediction (P). The prediction subsystem, the explanation subsystem, and the cryptographic interaction logger may receive user input (X) from the user device, such as a request for the prediction (P) and the explanation (E) of the prediction (P).

As further shown in FIG. 1A, the prediction subsystem may provide the prediction (P) to the cryptographic interaction logger and the feedback layer, and the explanation subsystem may provide the explanation (E) to the cryptographic interaction logger and the feedback layer. The feedback layer may provide the prediction (P) and the explanation (E) to the user device and the user device may display the prediction (P) and the explanation (E) to the user. The user may utilize the user device generate a change ($\Delta P$) for the prediction and/or a change ($\Delta E$) for the explanation of the prediction. The user device may provide the change ($\Delta P$) for the prediction and/or the change ($\Delta E$) for the explanation to the feedback collector, and the feedback collector may provide the change ($\Delta P$) for the prediction and/or the change ($\Delta E$) for the explanation to the cryptographic interaction logger. The cryptographic interaction logger may modify the machine learning model (e.g., the predictive machine learning model and/or the explainable machine learning model), based on the change (ΔP) for the prediction and/or the change (ΔE) for the explanation, to generate a modified machine learning model. The cryptographic interaction logger may encrypt the modifications to the machine learning model and the modified machine learning model, and may release an encrypted and modified machine learning model to the feedback layer, the prediction subsystem, and the explanation subsystem.

Figure 1B:
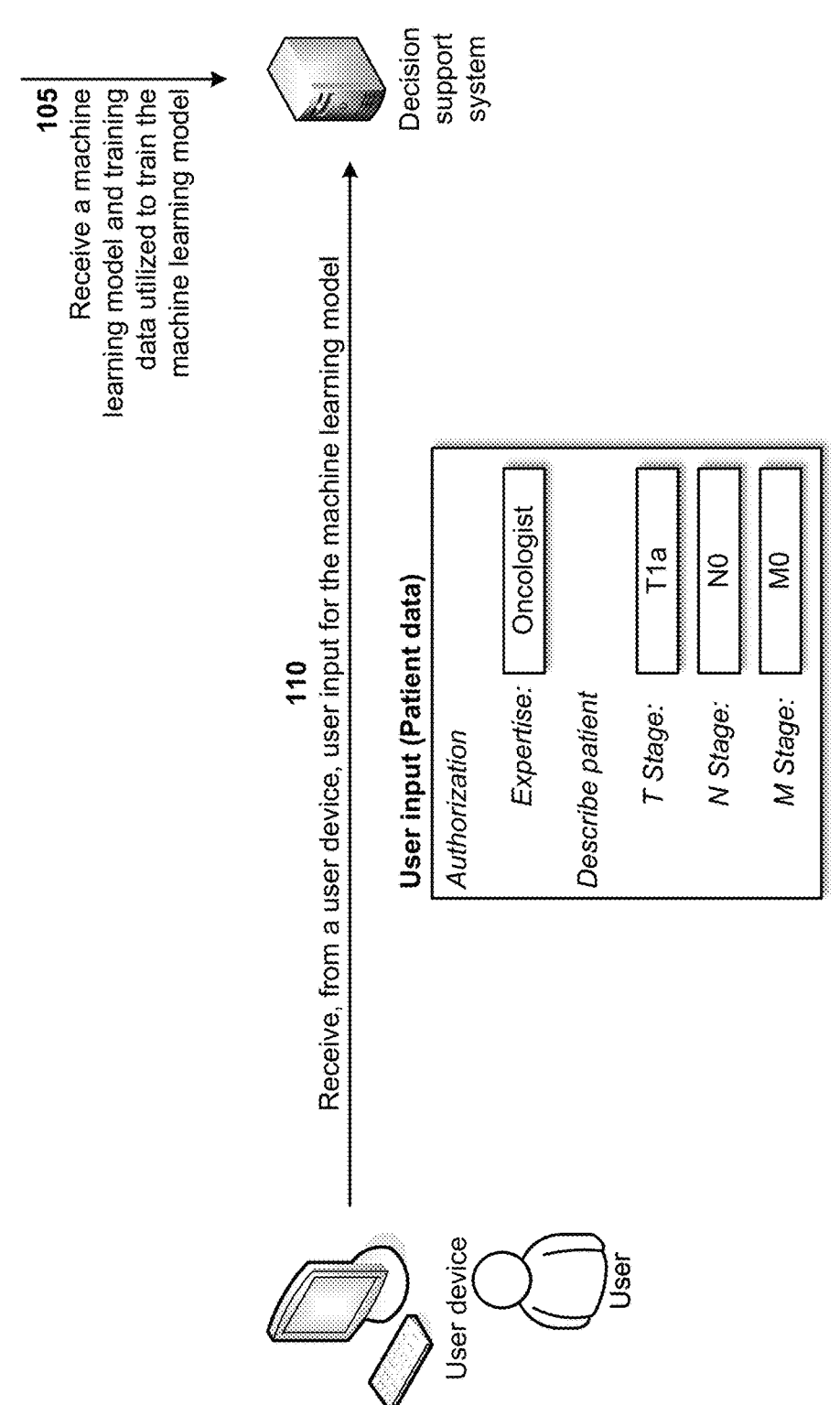

As shown in FIG. 1B, and by reference number 105, the decision support system may receive a machine learning model and training data utilized to train the machine learning model. The machine learning model may include any machine learning model, such as, for example, a machine learning model that predicts a relapse probability for a lung cancer patient associated with TNM features. The TNM features may be provided by a TNM staging system that describes an amount and spread of cancer in a patient's body. The TNM features may include a T stage feature that describes a size of a tumor in a patient's body, an N stage feature that describes the spread of cancer to nearby lymph nodes of the patient, and an M stage feature that describes metastasis of cancer to other parts of the patient's body. The training data may include the data utilized to train the machine learning model to perform a particular function. For example, the training data for a machine learning model that predicts a relapse probability for a lung cancer patient may include historical data identifying relapse predictions for multiple cancer patients, the TNM features associated with the relapse predictions, and/or the like.

As further shown in FIG. 1B, and by reference number 110, the decision support system may receive, from a user device, user input for the machine learning model. For example, the user input may include a request for a prediction from the machine learning model. In some implementations, the decision support system may receive the user input from the user device. In one example, the request may include a request for a prediction of a relapse probability for a lung cancer patient, information associated with the patient (e.g., a T stage feature that describes a size of a tumor in the patient's body, an N stage feature that describes the spread of cancer to nearby lymph nodes of the patient, and an M stage feature that describes metastasis of cancer to other parts of the patient's body), an expected prediction of the relapse probability, authorization information of the user (e.g., user expertise, a password, a passcode, a job title, etc.), and/or the like.

Figure 1C:
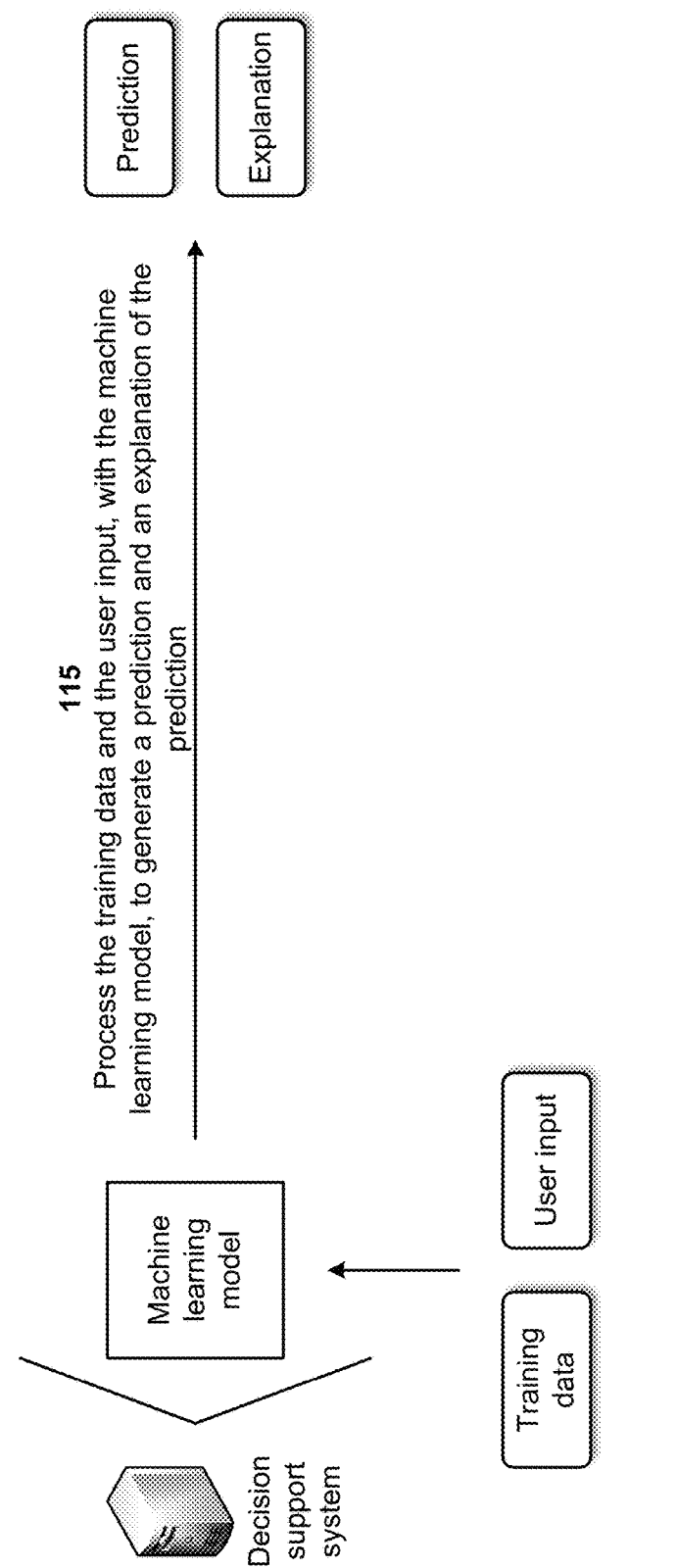

As shown in FIG. 1C, and by reference number 115, the decision support system may process the training data and the user input, with the machine learning model, to generate a prediction and an explanation of the prediction. For example, the prediction subsystem of the decision support system may process the training data and the user input, with the predictive machine learning model, to generate the prediction. The explanation subsystem of the decision support system may process the training data and the user input, with the explainable machine learning model, to generate the explanation of the prediction. Returning the example described above, the predictive machine learning model may generate a 0.8 relapse probability (e.g., the prediction) for the lung cancer patient, and the explainable machine learning model may generate an explanation indicating that the T stage feature contributed +0.025 to the 0.8 relapse probability, that the N stage feature contributed +0.125 to the 0.8 relapse probability, and that the M stage feature contributed +0.15 to the 0.8 relapse probability.

Figure 1D:
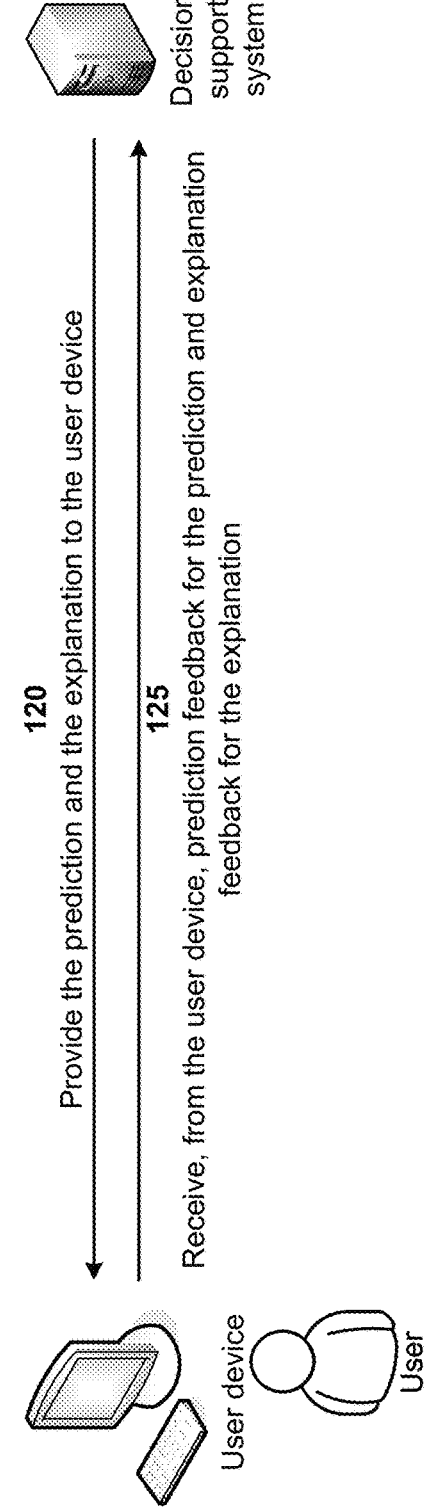

As shown in FIG. 1D, and by reference number 120, the decision support system may provide the prediction and the explanation to the user device. For example, the feedback layer of the decision support system may provide the prediction and the explanation of the prediction to the user device. The user device may receive the prediction and the explanation of the prediction, and may provide the prediction and the explanation of the prediction for display to the user. An example of a user interface that may be provided for display to the user is shown below in connection with FIG. 1E.

As further shown in FIG. 1D, and by reference number 125, the decision support system may receive, from the user device, prediction feedback for the prediction and explanation feedback for the explanation. For example, the user may utilize the user device to provide the prediction feedback for the prediction and the explanation feedback for the explanation. In some implementations, the user may utilize the user device generate a change (ΔP) for the prediction (e.g., as the prediction feedback) and/or a change (ΔE) for the explanation of the prediction (e.g., as the explanation feedback). The user device may provide prediction feedback (e.g., the change (ΔP) for the prediction) and/or the explanation feedback (e.g., the change (ΔE) for the explanation) to the decision support system, and the decision support system may receive, from the user device, the prediction feedback for the prediction and the explanation feedback for the explanation. In some implementations, the user may utilize the example user interface of FIG. 1E to provide the prediction feedback and the explanation feedback to the user device, as described below.

Figure 1E:
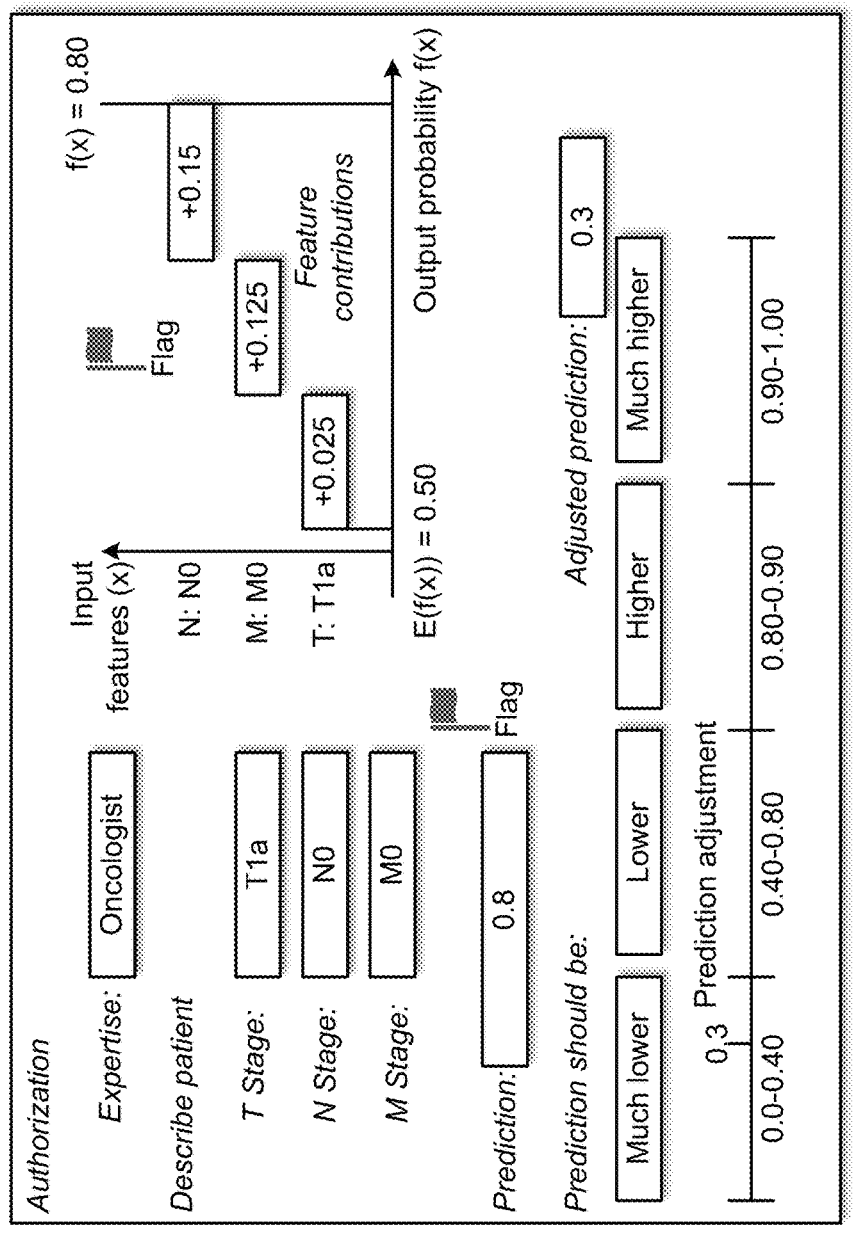

FIG. 1E is a diagram of an example user interface that may be provided by the decision support system to the user device, and that may be displayed by the user device to the user. As shown, the user interface may include a portion to receive the user input from the user. For example, the portion to receive the user input may include a section for provision of the authorization information of the user (e.g., user expertise, a password, a passcode, a job title, etc.), a section for provision of the information associated with the patient (e.g., the T stage feature that describes a size of a tumor in the patient's body, the N stage feature that describes the spread of cancer to nearby lymph nodes of the patient, and the M stage feature that describes metastasis of cancer to other parts of the patient's body), and/or the like.

As further shown in FIG. 1E, the user interface may include a portion that provides the prediction of the relapse probability for the lung cancer patient (e.g., 0.8) and a portion that provides an explanation of the predicted relapse probability. The portion that provides the explanation of the predicted relapse probability may include information identifying an expected relapse probability (e.g., E(f(x))=0.50), the predicted relapse probability (e.g., f(x)=0.80), that the T stage feature contributed +0.025 to the 0.8 predicted relapse probability, that the N stage feature contributed +0.125 to the 0.8 predicted relapse probability, and that the M stage feature contributed +0.15 to the 0.8 predicted relapse probability, and/or the like.

As further shown in FIG. 1E, the user interface may enable the user to flag the predicted relapse probability and/or the explanation of the predicted relapse probability (e.g., the feature contributions by the T stage feature, the N stage feature, and the M stage feature). For example, if the user determines that the predicted relapse probability and/or the explanation of the predicted relapse probability is incorrect, the user may mark the predicted relapse probability and/or the explanation of the predicted relapse probability as flagged and the decision support system may collect additional data (e.g., the prediction feedback and/or the explanation feedback) regarding expectations of the predicted relapse probability and/or the explanation of the predicted relapse probability. For example, when the user flags the predicted relapse probability, the user interface may enable the user to adjust the predicted relapse probability (e.g., adjust the predicted relapse probability by setting it directly to 0.3) and/or it may enable the user to indicate whether the the N:N0 edge from 0.15 to 0.005 (e.g., and the decision support system calculates a change of −0.145), the T:T1a edge from 0.125 to −0.1 (e.g., and the decision support system calculates a change of −0.225), and M:M0 edge from 0.025 to −0.2 (e.g., and the decision support system calculates a change of −0.225). Thus, a interaction log after the oncologist's feedback may include the following information:

| Authorization weight | Correction ($c_i$) | Prediction ($P_a$) | Original prediction ($P_o$) | dT | dN | dM |
|---|---|---|---|---|---|---|
| 1 | −1 | 0.1 | 0.8 | −0.2 | −0.3 | −0.2 |
| 1 | −1 | 0.2 | 0.8 | −0.3 | −0.2 | −0.1 |
| 2 | −1 | 0.4 | 0.8 | −0.1 | −0.2 | −0.1 |
| 3 | −1 | 0.3 | 0.8 | −0.145 | −0.225 | −0.225 | predicted relapse probability should be much lower (e.g., between 0.0 and 0.40), lower (e.g., between 0.40 and 0.80), higher (e.g., between 0.80 and 0.90), or much higher (e.g., between 0.90 and 1.00). When the user flags the explanation of the predicted relapse probability, the user interface enables an option to adjust sizes of bars of features contributions and to leave a comment regarding the desired change.

A user (e.g., an oncologist) may enter the information shown in FIG. 1E. For example, the oncologist may be successfully authorized as oncologist (e.g., weight=3) and may provide patient data: (e.g., a T stage of T1a, an N stage of N0, and an M stage of M0). The prediction of 0.8 may be generated by the decision support system, along with an explanation generated in the form of chart with bars representing features on a vertical axis and spanning over a horizontal axis representing probability. The chart may be constructed in such a way that the features that contributed the most to the prediction are placed at the top of the vertical axis. Moreover, horizontal bars may not overlap and may be arranged one after the other. The feature at the origin of the axis (e.g., at T: T1a in the example) starts at a level with an expected value (e.g., E[f(x)]=0.50) and a width that is proportional to a contribution that this feature has (e.g., +0.025). When this feature bar ends, one level above starts a next feature (e.g., M:M0) with a width that is proportional to a contribution this feature has towards the prediction. There may be more features and every feature bar may start one level above a previous feature and may span over a size that is proportional to a contribution to the prediction. The last feature (e.g., N:N0) may end in a place where the final prediction is located (e.g., f(x)=0.8). The oncologist may decide that the prediction and explanation are too high, so the oncologist may flag the prediction and explanation. When the oncologist flags the prediction and/or explanation, an editing mode may be entered and the oncologist can adjust the prediction either using coarse grain buckets (e.g., much lower, lower, higher, much higher) or by inserting a desired value in the adjusted prediction field. The oncologist may decide that the value should be much lower and may see that the adjusted prediction has changed to 0.2 (e.g., in the middle of the much lower bucket). The oncologist may that 0.2 is too low and may manually enters 0.3 in the adjusted prediction field. The oncologist may now switch to the explanation correction view, and may decrease values of each respective feature by dragging the edges of the feature contribution bars. For example, the oncologist may change The oncologist may submit the feedback and the decision support system may analyze the feedback. The decision support system may determine whether the provided feedback is coherent by performing the following check:

$$|P_o + dT + dN + dM - P_a| < c,$$

Where c=0.1, the decision support system determines that $|0.8-0.145-0.225-0.225-0.3|=0.095<c$ (0.1). This validation ensures that the provided corrections are coherent with each other and allows the decision support system to prevent quality-level corrections. The decision support system may check other entries from the interaction log of the users to determine whether to release a model update.

The decision support system may check the weights of users who think the prediction should be lower or higher. In this example, all of the users think the prediction should be lower (e.g., $c_i = -1$), therefore only this case is considered (e.g., $$\sum_i^n w_i \geq t:\ c_i = -1$$

There are four users with weights 1, 1, 2, and 3, and with an agreement threshold of t=6, the decision support system calculates $$\sum_i^4 w_i = 1 + 1 + 2 + 3 = 7 > 6.$$

Since the weights satisfy the threshold, the release may be implemented and the machine learning model may be updated.

The decision support system may calculate the release update to be issued to the machine learning model, according to the following equations:

$$\hat{P} = \frac{\sum_{i=1}^n P_i w_i}{\sum_{i=1}^n w_i},$$

$$\hat{dT} = \frac{\sum_{i=1}^n dT_i w_i}{\sum_{i=1}^n w_i},$$

-continued $$d\hat{N} = \frac{\sum_{i=1}^{n} dN_i w_i}{\sum_{i=1}^{n} w_i},$$

$$\widehat{dM} = \frac{\sum_{i=1}^{n} dM_i w_i}{\sum_{i=1}^{n} w_i},$$

$$\widehat{dP} = aT + bN + cM,$$

$$a = 1 + \widehat{dT},$$

$$b = 1 + d\hat{N},$$

$$c = 1 + d\hat{M}, \text{ and}$$

$$\left| \widehat{dP} - \hat{P} \right| \le tol.$$

Applying the quantities to the equations generates the following:

$$\hat{P} = \frac{0.1 * 1 + 0.2 * 1 + 0.4 * 2 + 0.3 * 3}{1 + 1 + 2 + 3} = \frac{2}{7} \sim 0.29,$$

$$\widehat{dT} = \frac{-0.2 * 1 + (-0.3) * 1 + (-0.1) * 2 + (-0.145) * 3}{7} = \frac{-1.335}{7} \sim -0.16,$$

$$\widehat{dN} = \frac{-1.575}{7} \sim -0.225,$$

$$\widehat{dM} = \frac{-1.175}{7} \sim -0.168,$$

$$a = 1 - 0.16 = 0.84,$$

$$b = 1 - 0.225 = 0.775,$$

$$c = 1 - 0.168 = 0.832,$$

$$\widehat{dP} = 0.84 * 0.025 + 0.775 * 0.15 + 0.832 * 0.125 \sim 0.24, \text{ and}$$

$$\left| \widehat{dP} - \hat{P} \right| = |0.24 - 0.29| = |-0.05| = 0.05 \le 0.05.$$

The calculated corrections may be within the acceptable tolerance range (≤tol) so the decision support system may issue the update with the new prediction $\hat{P}$ and the adjusted features contributions $\widehat{dT}$, $\widehat{dN}$, and $\widehat{dM}$. The decision support system may encrypt (e.g., and store in a block chain) the interaction log with the updated prediction, the updated explanation, the original prediction, and the original explanation.

Figure 1F:
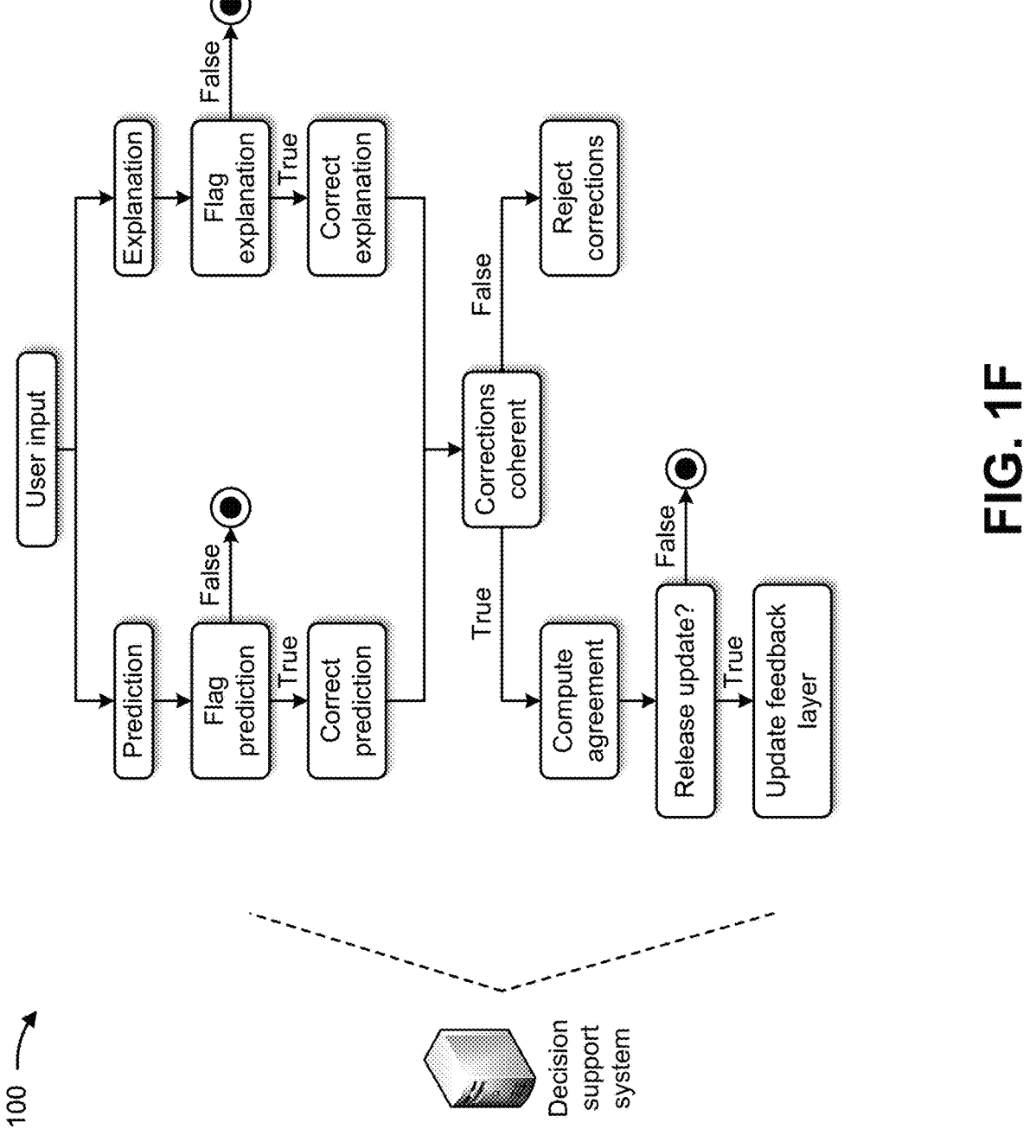

FIG. 1F is an activity diagram of example user interactions with the decision support system (e.g., via the user device). As shown, based on the user input, the decision support system may generate the prediction and the explanation of the prediction. The decision support system may determine whether the user flagged the prediction (e.g., via the user interface) and/or whether the user flagged the explanation (e.g., via the user interface). If the user fails to flag the prediction (e.g., Flag prediction=False), the user interactions for the prediction may cease. If the user fails to flag the explanation (e.g., Flag explanation=False), the user interactions for the explanation may cease. If the user flags the prediction (e.g., Flag prediction=True), the decision support system may receive (e.g., via the user interface) a prediction correction. If the user flags the explanation (e.g., Flag explanation=True), the decision support system may receive (e.g., via the user interface) an explanation correction.

As further shown in FIG. 1F, the decision support system may determine whether the prediction correction and the explanation correction are coherent (e.g., consistent with the prediction and consistent with the explanation of the prediction). If the prediction correction and the explanation correction are not coherent (e.g., Corrections coherent=False), the decision support system may reject the corrections. If the prediction correction and the explanation correction are coherent (e.g., Corrections coherent=True), the decision support system may compute an agreement between the prediction correction and prediction corrections received from other users (e.g., based on weights assigned to users and a quorum threshold) and/or an agreement between the explanation correction and explanation corrections received from other users (e.g., based on the weights assigned to users and the quorum threshold). Further details of computing the agreement are provided below in connection with FIG. 1G.

As further shown in FIG. 1F, the decision support system may determine whether to modify the machine learning model based on the agreement between the prediction correction and the prediction corrections received from other users and/or the agreement between the explanation correction and the explanation corrections received from other users. For example, the decision support system may determine whether the agreements satisfy a threshold level (e.g., the quorum threshold). In some implementations, the decision support system may determine to modify the machine learning model when the agreements satisfy the threshold level. The modification of the machine learning model may generate an updated release of the machine learning model (e.g., Release update=True), and the decision support system may provide the updated release of the machine learning model to the feedback layer. Alternatively, the decision support system may determine to not modify the machine learning model when the agreements fail to satisfy the threshold level. In such situations, the decision support system may not generate the updated release of the machine learning model (e.g., Release update=False), and may cease interactions with the corrections.

As shown in FIG. 1G, and by reference number 130, the decision support system may determine whether an agreement is achieved between the prediction feedback and the explanation feedback based on a quorum threshold. For example, the decision support system may determine whether there is sufficient agreement (e.g., based on quorum threshold) between the prediction correction and the explanation corrections received from other users and/or sufficient agreement (e.g., based on the quorum threshold) between the explanation correction and the explanation corrections received from other users. In some implementations, the decision support system may assign weights (w) to the user providing the prediction correction (P) and the explanation correction (E), and may assign weights (w) to the users providing the prediction corrections and the explanation corrections. For example, in a medical example, an oncologist may be assigned a greatest weight (e.g., 3), followed by a medical doctor (e.g., 2) and an intern (e.g., 1).

In some implementations, there may be two thresholds: a first threshold associated with an agreement between an explanation correction and a prediction correction provided by a single user and saved in the interaction log if an agreement is achieved; and a second threshold for determining an agreement between users based on user weights and provided prediction corrections and explanation corrections (e.g., a quorum threshold). When a sufficient number of users with adequate authorization levels (weights) contribute to the correction, then a release may be implemented to update the machine learning model.

In some implementations, the decision support system may calculate an average corrected prediction ($\hat{P}$) based on the prediction corrections ($P_i$) and the weights ($w_i$) as follows:

$$\hat{P} = \frac{\sum_{i=1}^{n} P_i w_i}{\sum_{i=1}^{n} w_i}.$$

The decision support system may calculate averages of corrections to the input features (e.g., $\widehat{dT}$, $\widehat{dN}$, and $\widehat{dM}$) as follows:

$$\widehat{dT} = \frac{\sum_{i=1}^{n} dT_i w_i}{\sum_{i=1}^{n} w_i},$$

$$\widehat{dN} = \frac{\sum_{i=1}^{n} dN_i w_i}{\sum_{i=1}^{n} w_i}, \text{ and}$$

$$\widehat{dM} = \frac{\sum_{i=1}^{n} dM_i w_i}{\sum_{i=1}^{n} w_i}.$$

The decision support system may calculate an average of the explanation corrections ($\widehat{dP}$) based on the averages of the corrections to the input features, as follows:

$$\widehat{dP} = aT + bN + cM, \text{ where}$$

$$a = 1 + \widehat{dT},$$

$$b = 1 + \widehat{dN}, \text{ and}$$

$$c = 1 + \widehat{dM}.$$

The decision support system may determine whether an agreement is achieved between the prediction feedback and the explanation feedback based on the average corrected prediction ($\hat{P}$), the average of the explanation corrections ($\widehat{dP}$), and the quorum threshold (tol), as follows:

$$\left| \widehat{dP} - \hat{P} \right| \le tol.$$

In some implementations, the decision support system may determine that the agreement is achieved between the prediction feedback and the explanation feedback based on the quorum threshold (e.g., when the quorum threshold is satisfied). Alternatively, the decision support system may determine that the agreement is not achieved between the prediction feedback and the explanation feedback based on a quorum threshold (e.g., when the quorum threshold is not satisfied).

In some implementations, when determining whether the agreement is achieved between the prediction feedback and the explanation feedback based on the quorum threshold, the decision support system may determine whether the prediction feedback and the explanation feedback are coherent, and may calculate an agreement level between the prediction feedback and the explanation feedback based on determining that the prediction feedback and the explanation feedback are coherent. The decision support system may determine whether the agreement level satisfies the quorum threshold, and may determine whether the agreement is achieved between the prediction feedback and the explanation feedback based on determining whether the agreement level satisfies the quorum threshold. When calculating the agreement level between the prediction feedback and the explanation feedback, the decision support system may assign weights to domain experts providing the prediction feedback and the explanation feedback, and may calculate the agreement level between the prediction feedback and the explanation feedback based on assigning the weights to the domain experts providing the prediction feedback and the explanation feedback.

In some implementations, when determining whether the agreement is achieved between the prediction feedback and the explanation feedback based on the quorum threshold, the decision support system may determine whether the agreement is achieved between the prediction feedback and the explanation feedback based on weights assigned to domain experts providing the prediction feedback and the explanation feedback.

As further shown in the table of FIG. 1G, two interns, one medical doctor, and an oncologist flagged the same prediction as too high (e.g., the prediction should be lower). Each of the interns may be assigned a weight of one (1), the medical doctor may be assigned a weight of two (2), and the oncologist may be assigned a weight of three (3). If the quorum threshold is six (6) in such an example, the decision support system may determine that quorum threshold is satisfied since $1+1+2+3=7$ and $7 > 6$. Thus, the decision support system may determine that the agreement is achieved between the prediction feedback and the explanation feedback based on the quorum threshold.

As further shown in FIG. 1G, and by reference number 135, the decision support system may prevent update of the machine learning model based on an agreement not being achieved between the prediction feedback and the explanation feedback. For example, when the decision support system determines that the agreement is not achieved between the prediction feedback and the explanation feedback based on a quorum threshold (e.g., when the quorum threshold is not satisfied), the decision support system may prevent an update to the machine learning model based on the prediction feedback and the explanation feedback.

Figure 1H:
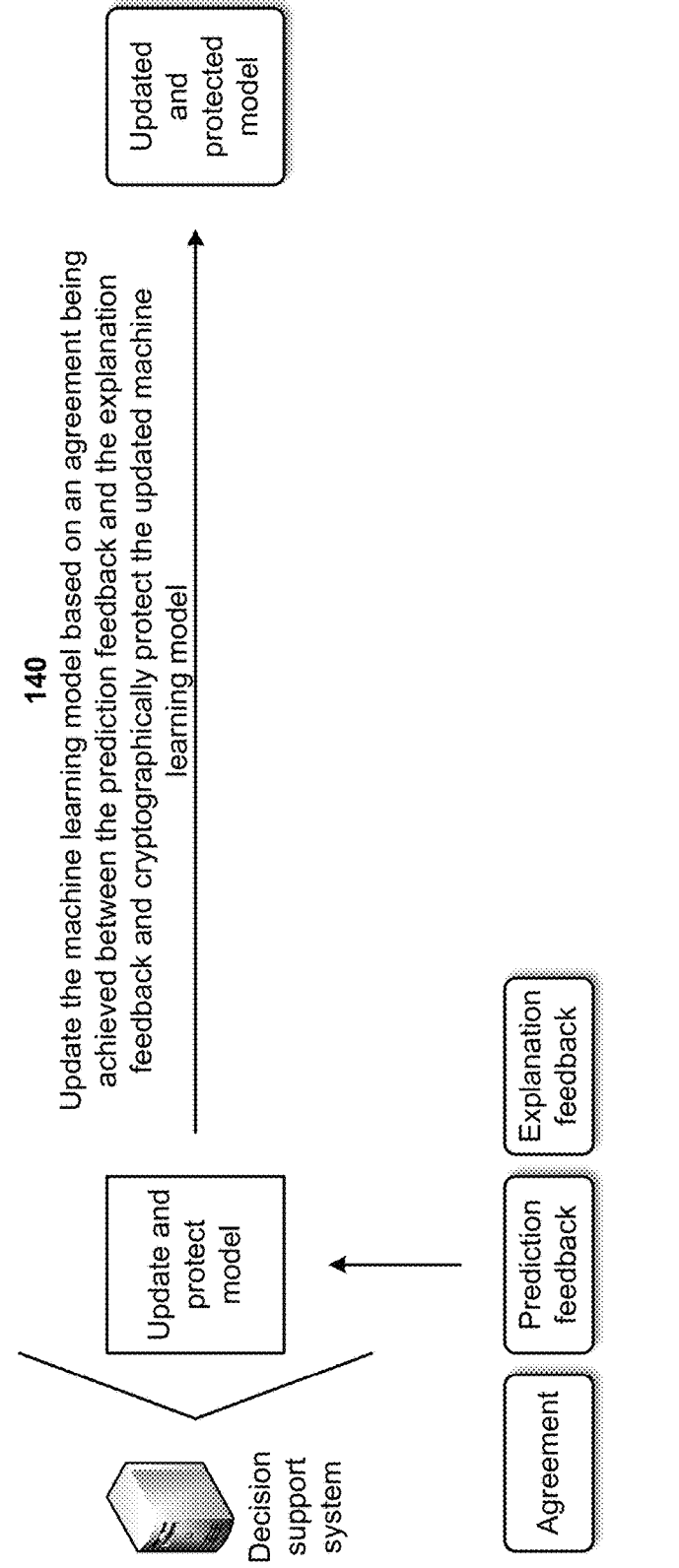

As shown in FIG. 1H, and by reference number 140, the decision support system may update the machine learning model based on an agreement being achieved between the prediction feedback and the explanation feedback and may cryptographically protect the updated machine learning model. For example, when the decision support system determines that the agreement is achieved between the prediction feedback and the explanation feedback based on a quorum threshold (e.g., when the quorum threshold is satisfied), the decision support system may update the machine learning model based on the prediction feedback and the explanation feedback. In some implementations, the prediction feedback and the explanation feedback may modify predictive capabilities of the machine learning model and may generate an updated machine learning model.

The decision support system may cryptographically protect the updated machine learning model to generate an updated and cryptographically protected machine learning model. For example, the decision support system may cryptographically hash the updated machine learning model (e.g., based on the prediction feedback and the explanation feedback) to generate the updated and cryptographically protected machine learning model. In some implementations, when cryptographically protecting the updated machine learning model to generate the updated and cryptographically protected machine learning model, the decision support system may generate a hash based on the prediction feedback and the explanation feedback, and may generate a block for the updated machine learning model based on the hash. The block may be part of a block chain and may correspond to the updated and cryptographically protected machine learning model. In this way, the decision support system may prevent tampering with domain expert feedback by encrypting the domain expert feedback into a block chain of blocks (e.g., where every block depends on a previous block's hash). The decision support system may enable historical updates to the machine learning model to be reviewed and may enable previous versions of the machine learning model (e.g., prior to updates) to be reimplemented.

As shown in FIG. 1I, and by reference number 145, the decision support system may perform one or more actions based on the updated and cryptographically protected machine learning model. In some implementations, performing the one or more actions includes the decision support system providing the updated and cryptographically protected machine learning model for display. For example, the decision support system may provide the updated and cryptographically protected machine learning model to the user device, and the user device may display features of the updated and cryptographically protected machine learning model to the user. The user may then determine whether additional modifications are necessary for the updated and cryptographically protected machine learning model. In this way, the decision support system conserves computing resources, networking resources, and/or the like that would otherwise have been consumed in failing to collect usable domain expert feedback for training of the machine learning model of the decision support system.

In some implementations, performing the one or more actions includes the decision support system causing the updated and cryptographically protected machine learning model to be implemented. For example, the decision support system may implement the updated and cryptographically protected machine learning model in order to make future predictions, such as predictions associated with relapse probabilities of cancer patients. In this way, the decision support system conserves computing resources, networking resources, and/or the like that would otherwise have been consumed in generating an erroneous decision support system based on failing to collect usable domain expert feedback and implementing the erroneous decision support system.

In some implementations, performing the one or more actions includes the decision support system retraining the updated and cryptographically protected machine learning model with the training data. For example, the decision support system may utilize new training data as additional training data for retraining the updated and cryptographically protected machine learning model, thereby increasing the quantity of training data available for training the updated and cryptographically protected machine learning model. Accordingly, the decision support system may conserve computing resources associated with identifying, obtaining, and/or generating historical data for training the updated and cryptographically protected machine learning model relative to other systems for identifying, obtaining, and/or generating historical data for training machine learning models.

In some implementations, performing the one or more actions includes the decision support system receiving additional prediction feedback and additional explanation feedback based on the updated and cryptographically protected machine learning model. For example, the decision support system may implement the updated and cryptographically protected machine learning model in order to make future predictions, and may receive additional prediction feedback and additional explanation feedback. The decision support system may utilize the additional prediction feedback and the additional explanation feedback to further improve the updated and cryptographically protected machine learning model. In this way, the decision support system conserves computing resources, networking resources, and/or the like that would otherwise have been consumed in utilizing incorrect results generated by an erroneous decision support system.

In some implementations, performing the one or more actions includes the decision support system generating a new prediction and a new explanation based on the updated and cryptographically protected machine learning model. For example, the decision support system may implement the updated and cryptographically protected machine learning model in order to make future predictions, and may generate a new prediction and a new explanation with the updated and cryptographically protected machine learning model. The new prediction and the new explanation may be approved by the domain users of the decision support system. In this way, the decision support system conserves computing resources, networking resources, and/or the like that would otherwise have been consumed in performing expensive and possibly unnecessary processes to correct the erroneous decision support system.

In this way, the decision support system provides a secure and collaborative feedback mechanism for machine learning models of the decision support system. For example, the decision support system may support collection of usable feedback from multiple domain experts for training of a machine learning model of the decision support system, and may directly utilize domain expert feedback with an agreement mechanism that improves the decision support system over time. The decision support system may provide a decision tracking mechanism that enables the decision support system to be transparent with regards to changes suggested by the domain experts. The decision support system may prevent tampering with domain expert feedback by encrypting the domain expert feedback into a block chain of blocks (e.g., where every block depends on a previous block's hash). The decision support system may enable historical updates to the machine learning model to be reviewed and may enable previous versions of the machine learning model (e.g., prior to updates) to be reimplemented.

This, in turn, conserves computing resources, networking resources, and/or the like that would otherwise have been consumed in failing to collect usable domain expert feedback for training of the machine learning model of the decision support system, generating an erroneous decision support system based on failing to collect usable domain expert feedback, implementing the erroneous decision support system, utilizing incorrect results generated by the erroneous decision support system, performing expensive and possibly unnecessary processes to correct the erroneous decision support system, and/or the like.

As indicated above, FIGS. 1A-1I are provided as an example. Other examples may differ from what is described with regard to FIGS. 1A-1I. The number and arrangement of devices shown in FIGS. 1A-1I are provided as an example.

In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
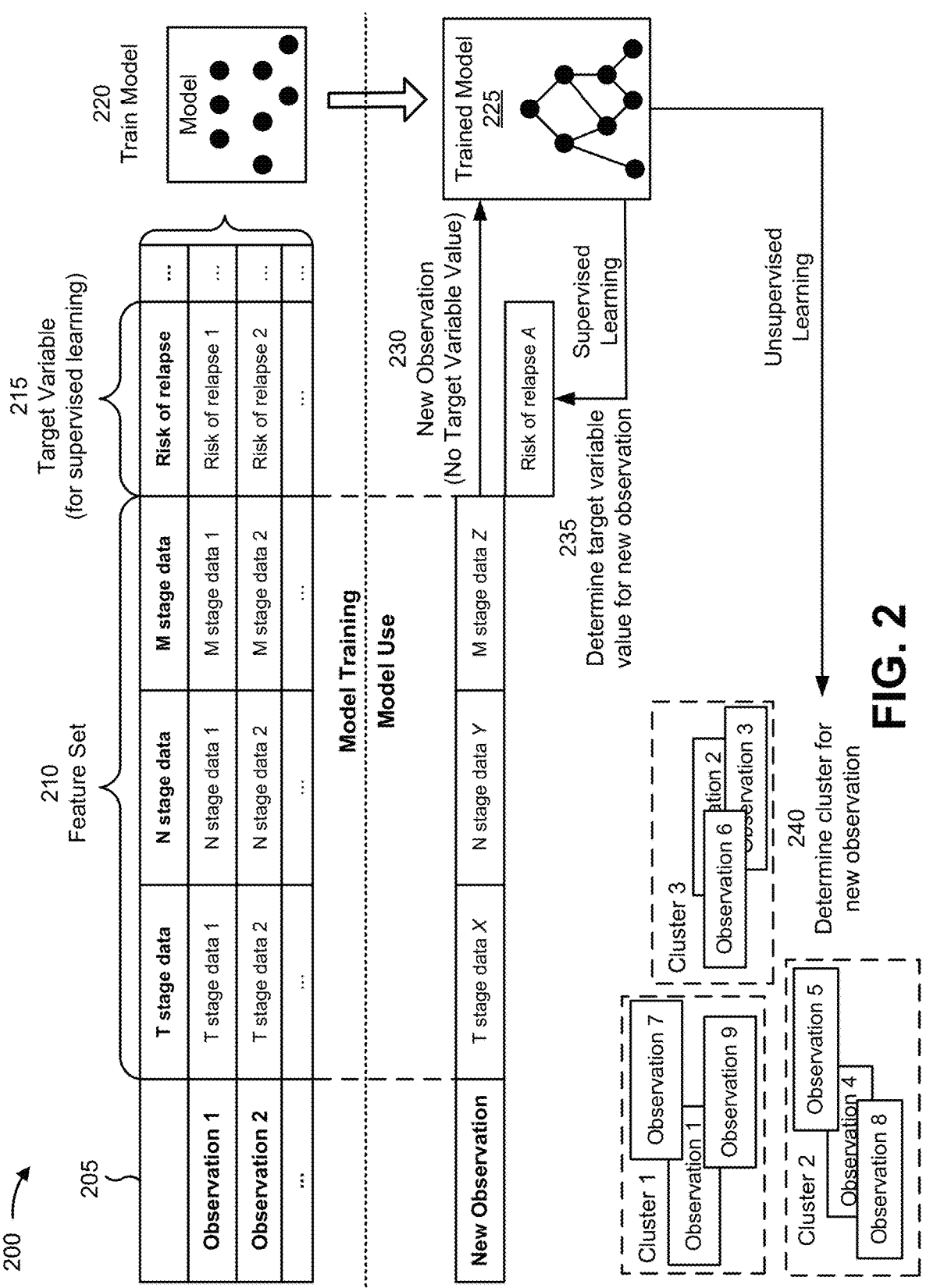
FIG. 2 is a diagram illustrating an example of training and using a machine learning model.

FIG. 2 is a diagram illustrating an example 200 of training and using a machine learning model. The machine learning model training and usage described herein may be performed using a machine learning system. The machine learning system may include or may be included in a computing device, a server, a cloud computing environment, and/or the like, such as the decision support system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the decision support system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the decision support system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of T stage data, a second feature of N stage data, a third feature of M stage data, and so on. As shown, for a first observation, the first feature may have a value of T stage data 1, the second feature may have a value of N stage data 1, the third feature may have a value of M stage data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable has a value of risk of relapse for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of T stage data X, a second feature of N stage data Y, a third feature of M stage data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of risk of relapse A for the target variable of the clustered events for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a T stage data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., an N stage data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine a target variable (e.g., a risk of relapse). The machine learning system enables recognition and/or identification of tens, hundreds, thousands, or millions of features and/or feature values for tens, hundreds, thousands, or millions of observations, thereby increasing accuracy and consistency and reducing delay associated with determining a target variable relative to requiring computing resources to be allocated for tens, hundreds, or thousands of operators to manually determine a target variable.

As indicated above, FIG. 2 is provided as an example. Other examples may differ from what is described in connection with FIG. 2.

Figure 3:
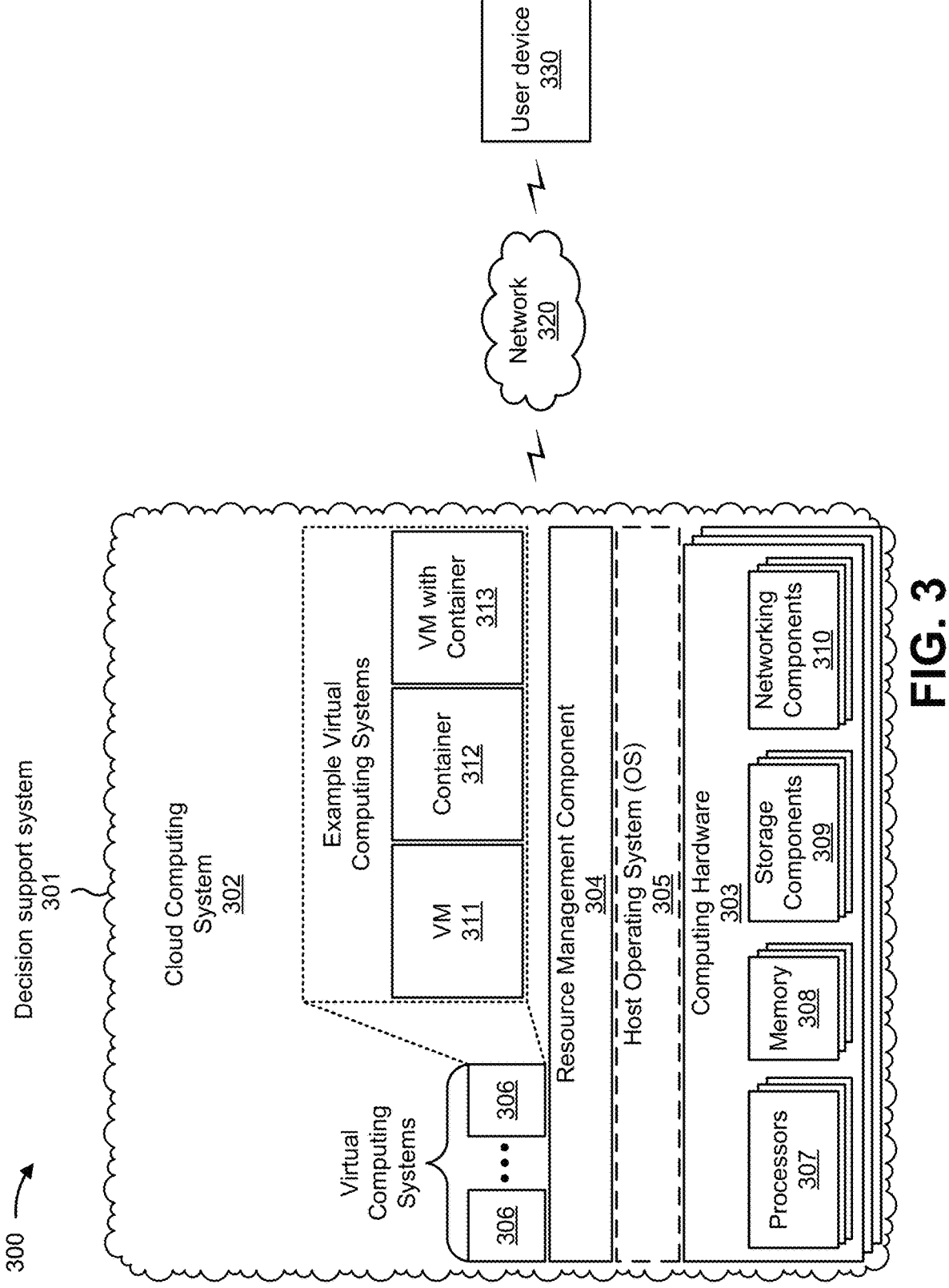
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a decision support system 301, which may include one or more elements of and/or may execute within a cloud computing system 302. The cloud computing system 302 may include one or more elements 303-313, as described in more detail below. As further shown in FIG. 3, the environment 300 may include a network 320 and/or a user device 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the decision support system 301 may include one or more elements 303-313 of the cloud computing system 302, may execute within the cloud computing system 302, and/or may be hosted within the cloud computing system 302, in some implementations, the decision support system 301 may not be cloud-based (e.g., may be implemented outside of a cloud computing system) or may be partially cloud-based. For example, the decision support system 301 may include one or more devices that are not part of the cloud computing system 302, such as a device 400 of FIG. 4, which may include a standalone server or another type of computing device. The decision support system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The user device 330 includes one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
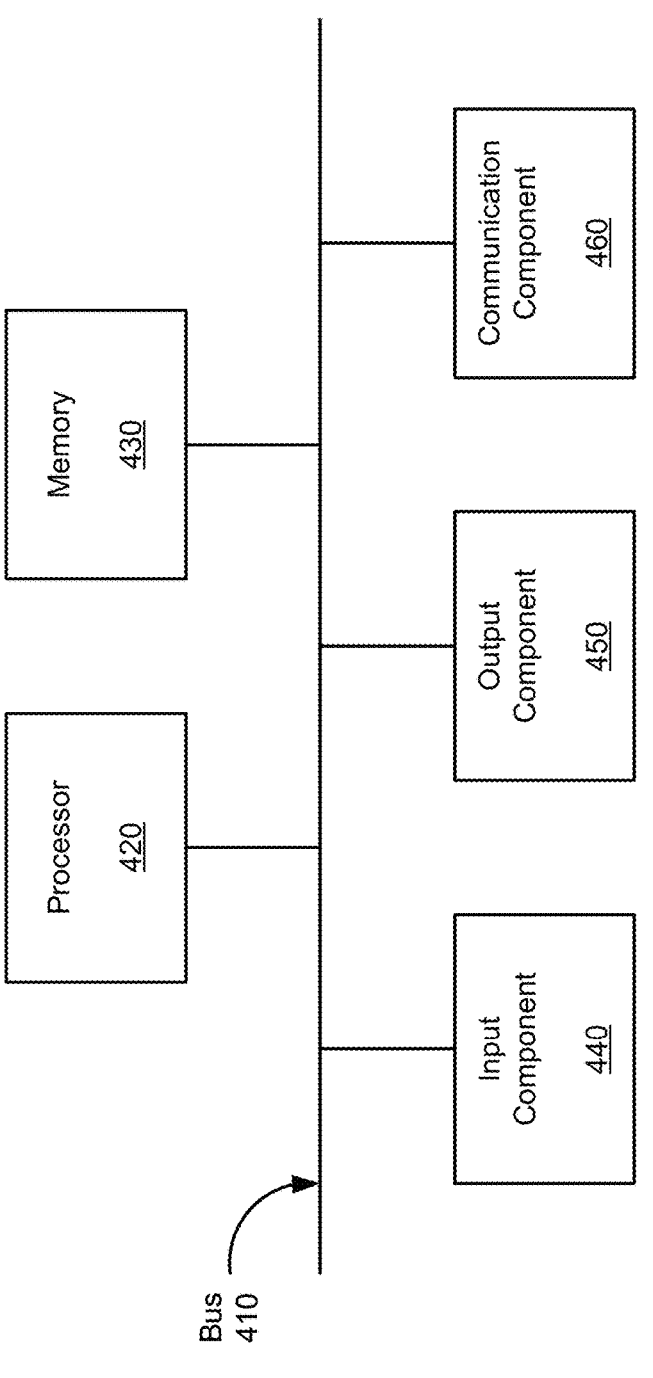
FIG. 4 is a diagram of example components of one or more devices of FIG. 3.

FIG. 4 is a diagram of example components of a device 400, which may correspond to the decision support system 301 and/or the user device 330. In some implementations, the decision support system 301 and/or the user device 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
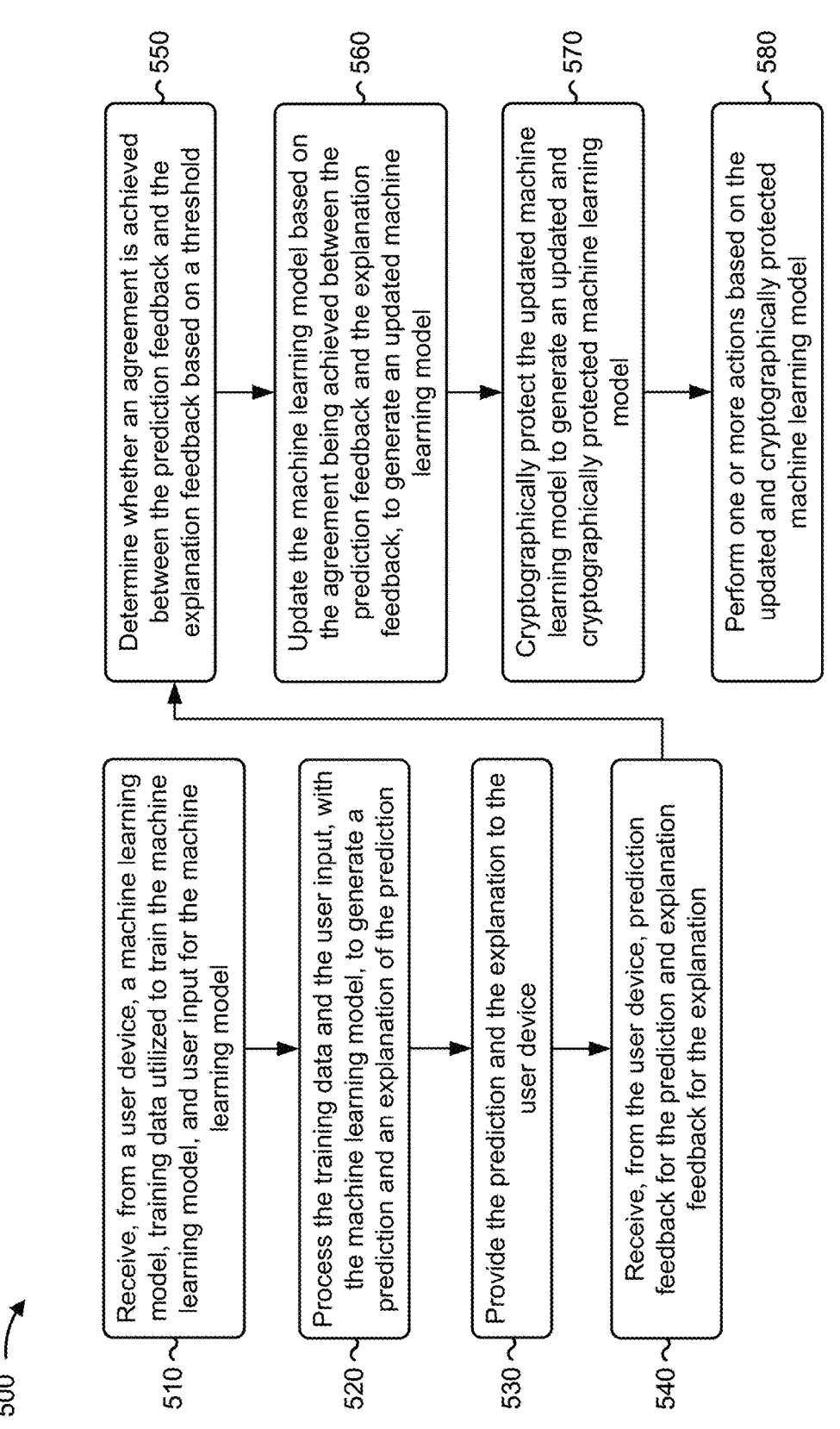
FIG. 5 is a flowchart of an example process for providing a secure and collaborative feedback mechanism for machine learning models of a decision support system.

FIG. 5 is a flowchart of an example process 500 for providing a secure and collaborative feedback mechanism for machine learning models of a decision support system. In some implementations, one or more process blocks of FIG. 5 may be performed by a device (e.g., the decision support system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving, from a user device, a machine learning model, training data utilized to train the machine learning model, and user input for the machine learning model (block 510). For example, the device may receive, from a user device, a machine learning model, training data utilized to train the machine learning model, and user input for the machine learning model, as described above. In some implementations, the device is a decision support system.

As further shown in FIG. 5, process 500 may include processing the training data and the user input, with the machine learning model, to generate a prediction and an explanation of the prediction (block 520). For example, the device may process the training data and the user input, with the machine learning model, to generate a prediction and an explanation of the prediction, as described above.

As further shown in FIG. 5, process 500 may include providing the prediction and the explanation to the user device (block 530). For example, the device may provide the prediction and the explanation to the user device, as described above.

As further shown in FIG. 5, process 500 may include receiving, from the user device, prediction feedback for the prediction and explanation feedback for the explanation (block 540). For example, the device may receive, from the user device, prediction feedback for the prediction and explanation feedback for the explanation, as described above. In some implementations, the prediction feedback includes feedback, about the prediction, provided by one or more domain experts, and wherein the explanation feedback includes feedback, about the explanation, provided by one or more domain experts.

As further shown in FIG. 5, process 500 may include determining whether an agreement is achieved between the prediction feedback and the explanation feedback based on a threshold (block 550). For example, the device may determine whether an agreement is achieved between the prediction feedback and the explanation feedback based on a threshold, as described above. In some implementations, determining whether the agreement is achieved between the prediction feedback and the explanation feedback based on the threshold includes determining whether the prediction feedback and the explanation feedback are coherent; calculating an agreement level between the prediction feedback and the explanation feedback based on determining that the prediction feedback and the explanation feedback are coherent; determining whether the agreement level satisfies the threshold; and determining whether the agreement is achieved between the prediction feedback and the explanation feedback based on determining whether the agreement level satisfies the threshold. In some implementations, calculating the agreement level between the prediction feedback and the explanation feedback includes calculating the agreement level between the prediction feedback and the explanation feedback based on weights assigned to domain experts providing the prediction feedback and the explanation feedback.

In some implementations, determining whether the agreement is achieved between the prediction feedback and the explanation feedback based on the threshold includes determining whether the agreement is achieved between the prediction feedback and the explanation feedback based on weights assigned to domain experts providing the prediction feedback and the explanation feedback.

As further shown in FIG. 5, process 500 may include updating the machine learning model based on the agreement being achieved between the prediction feedback and the explanation feedback, to generate an updated machine learning model (block 560). For example, the device may update the machine learning model based on the agreement being achieved between the prediction feedback and the explanation feedback, to generate an updated machine learning model, as described above. In some implementations, updating the machine learning model includes updating the machine learning model, to generate the updated machine learning model, based on the prediction feedback and the explanation feedback.

As further shown in FIG. 5, process 500 may include cryptographically protecting the updated machine learning model to generate an updated and cryptographically protected machine learning model (block 570). For example, the device may cryptographically protect the updated machine learning model to generate an updated and cryptographically protected machine learning model, as described above. In some implementations, cryptographically protecting the updated machine learning model to generate the updated and cryptographically protected machine learning model includes generating a hash based on the prediction feedback and the explanation feedback, and generating a block for the updated machine learning model based on the hash, wherein the block is part of a block chain and corresponds to the updated and cryptographically protected machine learning model.

As further shown in FIG. 5, process 500 may include performing one or more actions based on the updated and cryptographically protected machine learning model (block 580). For example, the device may perform one or more actions based on the updated and cryptographically protected machine learning model, as described above. In some implementations, performing the one or more actions based on the updated and cryptographically protected machine learning model includes providing the updated and cryptographically protected machine learning model for display, or causing the updated and cryptographically protected machine learning model to be implemented. In some implementations, performing the one or more actions based on the updated and cryptographically protected machine learning model includes retraining the updated and cryptographically protected machine learning model with the training data.

In some implementations, performing the one or more actions based on the updated and cryptographically protected machine learning model includes receiving additional prediction feedback and additional explanation feedback based on the updated and cryptographically protected machine learning model. In some implementations, performing the one or more actions based on the updated and cryptographically protected machine learning model includes generating a new prediction and a new explanation based on the updated and cryptographically protected machine learning model.

In some implementations, process 500 includes preventing an update of the machine learning model based on the agreement not being achieved between the prediction feedback and the explanation feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method for providing feedback mechanism for machine learning models, comprising:

receiving, by a device and from a server, a machine learning model and training data to train the machine learning model;

receiving, by the device and from a user device, a user input for the machine learning model, wherein the user input includes:

a request for a prediction of a relapse probability for a patient, information associated with health of the patient, and an authorization information of the user;

processing, by the device, the training data and the user input, with the machine learning model, to generate the relapse probability prediction for the patient, and an explanation of the relapse probability prediction for the patient, wherein the machine learning model includes a predictive machine learning model to generate the relapse probability prediction for the patient and an explainable machine learning model to generate the explanation of the relapse probability prediction for the patient;

providing, by the device, the relapse probability prediction for the patient and the explanation of the relapse probability prediction for the patient to the user device;

receiving, by the device and from the user device, prediction feedback for the relapse probability prediction for the patient and explanation feedback for the explanation of the relapse probability prediction for the patient;

generating, via the user device, a change (AP) for the relapse probability prediction for the patient as the prediction feedback and a change (AE) for the explanation of the relapse probability prediction for the patient as the explanation feedback;

determining, by the device, coherency between the prediction feedback and the explanation feedback on the basis of $|P_o+dT+dN+dM-P_a|<c$, wherein $P_o$ is the prediction, $P_a$ is the prediction feedback, dT is a change in a T stage feature, dN is a change in a N stage feature, dM is a change in a M stage feature and c is a correction;

receiving, by the device, entries of predictions, prediction feedback and explanation feedback from other users from an interaction log of the other users;

computing, by the device, an agreement between the prediction feedback of the user and the prediction feedback received from the other users and an agreement between the explanation feedback of the user and the explanation feedback received from the other users based on the determined coherency between the prediction feedback and the explanation feedback of the user;

determining, by the device, that the agreement is less than or equal to a quorum threshold;

determining, by the device, that the agreement is achieved between the prediction feedback and the explanation feedback based on the determination that the agreement is less than or equal to the quorum threshold;

updating, by the device, the machine learning model based on the determination that the agreement is achieved between the prediction feedback and the explanation feedback, to generate an updated machine learning model;

cryptographically protecting, by the device, the updated machine learning model to generate an updated and cryptographically protected machine learning model, by:

generating a hash based on the prediction feedback and the explanation feedback, and generating a block for the updated machine learning model based on the hash, wherein the block is part of a block chain and corresponds to the updated and cryptographically protected machine learning model;

performing, by the device, one or more actions based on the updated and cryptographically protected machine learning model; and implementing, by the device, the updated and cryptographically protected machine learning model to make predictions associated with the relapse probability of the patient to expedite treatment of the patient.

2. The method of claim 1, further comprising:

preventing an update of the machine learning model based on the agreement not being achieved between the prediction feedback and the explanation feedback.

3. The method of claim 1, wherein calculating the agreement level between the prediction feedback and the explanation feedback comprises:

calculating the agreement level between the prediction feedback and the explanation feedback based on weights assigned to domain experts providing the prediction feedback and the explanation feedback.

4. The method of claim 1, wherein determining that the agreement is achieved between the prediction feedback and the explanation feedback based on the threshold comprises:

determining that the agreement is achieved between the prediction feedback and the explanation feedback based on weights assigned to domain experts providing the prediction feedback and the explanation feedback.

5. The method of claim 1, wherein the prediction feedback includes feedback, about the prediction, provided by one or more domain experts, and wherein the explanation feedback includes feedback, about the explanation, provided by one or more domain experts.

6. The method of claim 1, wherein updating the machine learning model comprises:

updating the machine learning model, to generate the updated machine learning model, based on the prediction feedback and the explanation feedback.

7. The method of claim 1, wherein determining whether the agreement is achieved between the prediction feedback and the explanation feedback based on an average corrected prediction, an average of explanation corrections, and the quorum threshold.

8. A device, for providing feedback mechanism for machine learning models, comprising:

one or more memories; and one or more processors, coupled to the one or more memories, configured to:

receive, from a server, the machine learning model and training data to train the machine learning model;

receive, from a user device, a user input for the machine learning model;
  wherein the user input includes:
    a request for a prediction of a relapse probability for a patient,
    information associated with the health of the patient, sand
    an authorization information of the user;
process the training data and the user input, with the machine learning model, to generate the relapse probability prediction for the patient, and an explanation of the relapse probability prediction for the patient,
  wherein the machine learning model includes a predictive machine learning model to generate the relapse probability prediction for the patient and an explainable machine learning model to generate the explanation of the relapse probability prediction for the patient;
provide the relapse probability prediction for the patient and the explanation of the relapse probability prediction for the patient to the user device;
receive, from the user device, prediction feedback for the relapse probability prediction for the patient and explanation feedback for the explanation of the relapse probability prediction for the patient;
generate, via the user device, a change (AP) for the relapse probability prediction for the patient as the prediction feedback and a change (AE) for the explanation of the relapse probability prediction for the patient as the explanation feedback;
determining, by the device, coherency between the prediction feedback and the explanation feedback on the basis of $|P_o + dT + dN + dM - P_a| < c$,
  wherein $P_o$ is the prediction, $P_a$ is the prediction feedback, dT is a change in a T stage feature, dN is a change in a N stage feature, dM is a change in a M stage feature and c is a correction;
receive entries of predictions, prediction feedback and explanation feedback from other users from an interaction log of the other users;
compute an agreement between the prediction feedback of the user and the prediction feedback received from the other users and an agreement between the explanation feedback of the user and the explanation feedback received from the other users based on the determined coherency between the prediction feedback and the explanation feedback of the user;
determine that the agreement is less than or equal to a quorum threshold;
determine that the agreement is achieved between the prediction feedback and the explanation feedback based on determination that the agreement is less than or equal to the quorum threshold;
update the machine learning model based on the determination that the agreement is achieved between the prediction feedback and the explanation feedback, to generate an updated machine learning model;
cryptographically protect the updated machine learning model to generate an updated and cryptographically protected machine learning model by,
  generating a hash based on the prediction feedback and the explanation feedback, and
  generating a block for the updated machine learning model based on the hash,
    wherein the block is part of a block chain and corresponds to the updated and cryptographically protected machine learning model;

perform one or more actions based on the updated and cryptographically protected machine learning model; and
implement the updated and cryptographically protected machine learning model to make predictions associated with the relapse probability of the patient to expedite treatment of the patient.

9. The device of claim 8, wherein the device is a decision support system.

10. The device of claim 8, wherein the one or more processors, to perform the one or more actions based on the updated and cryptographically protected machine learning model, are configured to:
  provide the updated and cryptographically protected machine learning model for display; or
  cause the updated and cryptographically protected machine learning model to be implemented.

11. The device of claim 8, wherein the one or more processors, to perform the one or more actions based on the updated and cryptographically protected machine learning model, are configured to:
  retrain the updated and cryptographically protected machine learning model with the training data.

12. The device of claim 8, wherein the one or more processors, to perform the one or more actions based on the updated and cryptographically protected machine learning model, are configured to:
  receive additional prediction feedback and additional explanation feedback based on the updated and cryptographically protected machine learning model.

13. The device of claim 8, wherein the one or more processors, to perform the one or more actions based on the updated and cryptographically protected machine learning model, are configured to:
  generate a new prediction and a new explanation based on the updated and cryptographically protected machine learning model.

14. The device of claim 8, wherein the one or more processors to update the machine learning model, are configured to:
  encrypt the interaction log with an updated prediction, updated explanation, an original prediction, and an original explanation.

15. A non-transitory computer-readable medium storing a set of instructions, the set of instructions for providing feedback mechanism for machine learning models, comprising:
  one or more instructions that, when executed by one or more processors of a device, cause the device to:
  receive, from a server, the machine learning model and training data to train the machine learning model;
  receive, from a user device, a user input for the machine learning model;
    wherein the user input includes:
      a request for a prediction of a relapse probability for a patient,
      information associated with the health of the patient, and
      an authorization information of the user;
  process the training data and the user input, with the machine learning model, to generate the relapse probability prediction for the patient, and an explanation of the relapse probability prediction for the patient,
    wherein the machine learning model includes a predictive machine learning model to generate the relapse probability prediction for the patient and an explainable machine learning model to generate the explanation of the relapse probability prediction for the patient;

provide the relapse probability prediction for the patient and the explanation of the relapse probability prediction for the patient to the user device;

receive, from the user device, prediction feedback for the relapse probability prediction for the patient and explanation feedback for the explanation of the relapse probability prediction for the patient;

generate, via the user device, a change (AP) for the relapse probability prediction for the patient as the prediction feedback and a change (AE) for the explanation of the relapse probability prediction for the patient as the explanation feedback;

determine coherency between the prediction feedback and the explanation feedback on the basis of $|P_o + dT + dN + dM - P_a| < c$, wherein $P_o$ is the prediction, $P_a$ is the prediction feedback, dT is a change in a T stage feature, dN is a change in a N stage feature, dM is a change in a M stage feature and c is a correction;

receive entries of predictions, prediction feedback and explanation feedback from other users from an interaction log of the other users;

compute an agreement between the prediction feedback of the user and the prediction feedbacks received from the other users and an agreement between the explanation feedback of the user and the explanation feedback received from the other users based on the determined coherency between the prediction feedback and the explanation feedback of the user;

determine that the agreement is less than or equal to a quorum threshold;

determine that the agreement is achieved between the prediction feedback and the explanation feedback based on determination that the agreement is less than or equal to the quorum threshold;

update the machine learning model based on the determination that the agreement is being achieved between the prediction feedback and the explanation feedback, to generate an updated machine learning model;

cryptographically protect the updated machine learning model to generate an updated and cryptographically protected machine learning model by, generating a hash based on the prediction feedback and the explanation feedback, and generating a block for the updated machine learning model based on the hash, wherein the block is part of a block chain and corresponds to the updated and cryptographically protected machine learning model;

perform one or more actions based on the updated and cryptographically protected machine learning model; and implement the updated and cryptographically protected machine learning model to make future predictions associated with the relapse probability of the patient to expedite treatment of the patient.

16. The non-transitory computer-readable medium of claim 15, wherein the one or more instructions, that cause the device to calculate the agreement level between the prediction feedback and the explanation feedback, cause the device to:

calculate the agreement level between the prediction feedback and the explanation feedback based on weights assigned to domain experts providing the prediction feedback and the explanation feedback.

17. The non-transitory computer-readable medium of claim 15, wherein the one or more instructions, that cause the device to determine that the agreement is achieved between the prediction feedback and the explanation feedback based on the threshold, cause the device to:

determine that the agreement is achieved between the prediction feedback and the explanation feedback based on weights assigned to domain experts providing the prediction feedback and the explanation feedback.

18. The non-transitory computer-readable medium of claim 15, wherein the one or more instructions, that cause the device to update the machine learning model, cause the device to:

update the machine learning model, to generate the updated machine learning model, based on the prediction feedback and the explanation feedback.

19. The non-transitory computer-readable medium of claim 15, wherein the one or more instructions, that cause the device to determine the agreement is achieved between the prediction feedback and the explanation feedback based on an average corrected prediction, an average of explanation corrections, and the quorum threshold.

20. The non-transitory computer-readable medium of claim 15, wherein the one or more instructions, that cause the device to update the machine learning model, cause the device to:

encrypt the interaction log with an updated prediction, updated explanation, an original prediction, and an original explanation.

\* \* \* \* \*